United States Patent [19]

Ziu

[11] Patent Number: 5,018,260
[45] Date of Patent: May 28, 1991

[54] SUPPORTS FOR DOUBLE-CONTAINMENT THERMOPLASTIC PIPE ASSEMBLIES

[75] Inventor: Christopher G. Ziu, Charlestown, Mass.

[73] Assignee: Asahi/America, Inc., Medford, Mass.

[21] Appl. No.: 356,700

[22] Filed: May 26, 1989

[51] Int. Cl.$^5$ .............................. F16L 3/08; F16L 3/13
[52] U.S. Cl. ..................................... 24/555; 138/108; 138/113; 138/148; 248/49; 248/74.2; 285/133.1; 285/138
[58] Field of Search ............... 138/111, 112, 113, 114, 138/108; 285/133.1, 138, 177, 141, 140, 415, 902; 228/44.5, 49.3, 128; 16/2, 108, 109; 248/49, 74.2; 24/335-339, 20 R, 20 S, 457, 458, 555

[56] References Cited

U.S. PATENT DOCUMENTS

| 2,470,811 | 5/1944 | Engleman | 24/339 X |
| 2,702,036 | 2/1955 | Bent | 285/138 |
| 2,739,615 | 3/1956 | Wurzel | 285/138 |
| 3,521,332 | 7/1970 | Kramer | 248/74.2 X |
| 3,581,776 | 10/1968 | Sheahan | 138/113 |
| 3,829,184 | 8/1974 | Chevret | 16/2 |
| 3,894,706 | 7/1975 | Mizusawa | 248/74.2 X |
| 3,991,446 | 11/1976 | Mooney et al. | 16/2 |
| 3,996,417 | 12/1976 | Annas | 16/108 |
| 4,098,476 | 7/1978 | Jutte et al. | 138/114 |
| 4,119,285 | 10/1978 | Bisping et al. | 248/74.2 X |
| 4,121,798 | 10/1978 | Schumacher et al. | 24/336 X |
| 4,134,175 | 1/1979 | Contoyanis | 16/2 |
| 4,244,544 | 1/1981 | Kornat | 248/74.2 X |
| 4,250,927 | 2/1981 | Newburg | 138/114 |
| 4,306,697 | 12/1981 | Mathews | 248/74.2 X |
| 4,334,342 | 6/1982 | Hall | 285/415 |
| 4,723,795 | 2/1988 | Shenoy | 285/138 |
| 4,754,782 | 7/1988 | Grantham | 138/113 |
| 4,786,088 | 11/1988 | Ziu | 285/138 |
| 4,896,701 | 1/1990 | Young | 138/113 |
| 4,936,530 | 6/1990 | Wollar | 248/74.2 X |

FOREIGN PATENT DOCUMENTS

| 1534833 | 8/1968 | France | 24/339 |
| 91503 | 4/1958 | World Int. Prop. O. | 24/339 |

Primary Examiner—Timothy F. Simone
Assistant Examiner—C. E. Cooley
Attorney, Agent, or Firm—Anthony J. Casella; Gerald E. Hespos

[57] ABSTRACT

A double-containment pipe assembly is provided with an inner carrier pipe, an outer containment pipe and supports for maintaining concentrically therebetween. The supports may define resilient support clips of unitary construction. Each resilient support clip includes a mounting portion defining a section of a cylinder from which a plurality of support legs extend. One end of each support leg may be tapered to facilitate insertion into the containment pipe. One end of the support clip may also include a reinforcement flange extending partly thereabout to prevent overstress related damage to the support clip. The support clips may alternatively define unitarily molded planar structures having a circular inner support surface and a plurality of spaced apart outer support surfaces defining arcs of a circle concentric with the inner support surface. The outer support surfaces preferably are separated by inwardly formed passages to permit the passage of a sensor wire in the annular space between the carrier and containment pipes.

1 Claim, 3 Drawing Sheets

5,018,260

SUPPORTS FOR DOUBLE-CONTAINMENT THERMOPLASTIC PIPE ASSEMBLIES

BACKGROUND OF THE INVENTION

Thermoplastic pipes, fittings and valves have received wide commercial acceptance in both industrial and residential markets in view of their relatively light weight, their relatively low cost and installation efficiencies as compared to most metallic pipes, fittings and valves. Furthermore, the thermoplastic materials from which these pipes, fittings and valves can be made are particularly resistant to caustic chemicals. As a result, thermoplastic pipes, fittings and valves have been widely accepted by the chemical and petrochemical industries for transporting highly caustic chemicals.

Leaks of chemicals from pipe systems have the potential for creating catastrophic environmental damage and personal injury. In view of these risks, a substantial demand has developed recently for double-containment pipe systems. One extremely effective double-containment pipe system is shown in U.S. Pat. No. 4,786,088 which issued to Christopher G. Ziu on Nov. 22, 1988 and which is assigned to the assignee of the subject invention. The disclosure of U.S. Pat. No. 4,786,088 is incorporated herein by reference. U.S. Pat. No. 4,786,088 shows a double-containment thermoplastic pipe assembly which includes inner and outer pipes that are retained in generally concentric relationship by a plurality of resilient support clips disposed therebetween. In particular, the support clips of U.S. Pat. No. 4,786,088 comprise a resilient mounting portion which defines a cylindrical arc of approximately 270°. Three support legs are fused to the mounting portion and extend generally radially therefrom. Each support leg is of generally rectangular configuration and defines a radial dimension to enable the concentric support of the inner and outer pipes relative to one another. The double-containment thermoplastic pipe assembly shown in U.S. Pat. No. 4,786,088 further includes restraint couplings having a cylindrical inner carrier pipe portion, a cylindrical outer containment pipe portion and a unitary connecting portion extending therebetween. The restraint couplings are deployed at spaced apart locations along the double-containment thermoplastic pipe system to control and isolate differential expansion that may exist between the inner and outer pipes.

The double-containment thermoplastic pipe system shown in U.S. Pat. No. 4,786,088 is assembled by sliding the support clips longitudinally along the inner carrier pipe or snapping the support clips over the inner pipe at selected spaced apart locations therealong. The inner pipe with the support clips mounted thereto is then slid longitudinally within a selected outer containment pipe. The ends of the respective inner carrier pipe and outer containment pipe of the system shown in U.S. Pat. No. 4,786,088 generally are offset relative to one another to facilitate the connection of adjacent inner containment pipes to one another and the subsequent connection of adjacent outer containment pipes to one another. In particular, the inner carrier pipe of a previously positioned portion of a system may extend a greater axial distance than the corresponding outer containment pipe. The next sequential inner carrier pipe may then be butt-fused to the previously implaced inner carrier pipe. The next outer containment pipe may then be slid axially relative to the fused inner carrier pipes to enable the butt-fusing of the outer containment pipes. As shown in U.S. Pat. No. 4,786,088, the restraint couplings have a similar offset of the inner carrier portions and outer containment portions to facilitate this sequential butt-fusion.

Although the pipe system shown in U.S. Pat. No. 4,786,088 is extremely effective, it is desirable to provide a double-containment thermoplastic pipe assembly providing even greater efficiency and effectiveness.

In view of the above, it is an object of the subject invention to provide a double-containment thermoplastic pipe assembly having support clips that more securely engage the inner carrier pipe.

It is another object of the subject invention to provide a double-containment thermoplastic pipe assembly having support clips that will not break or permanently deform when being snapped over the inner carrier pipe.

It is another object of the subject invention to provide a double-containment thermoplastic pipe assembly that facilitates the slidable axial insertion of an inner carrier pipe into an outer containment pipe.

Still another object of the subject invention is to provide a double-containment thermoplastic pipe assembly having a plurality of inexpensive supports that facilitate the simultaneous butt-fusion of both the inner carrier pipe and the outer containment pipe to adjacent inner and outer pipes.

Yet another object of the subject invention is to provide a double-containment thermoplastic pipe assembly wherein at least selected supports between the inner and outer pipes contribute to the restraint of differential expansion.

SUMMARY OF THE INVENTION

The subject invention is directed to a double-containment thermoplastic pipe assembly having an inner carrier pipe and an outer containment pipe disposed in generally concentric relationship to one another. The inner carrier pipe and the outer containment pipe each may be formed from a plurality of longitudinally extending sections that are secured in end-to-end relationship by butt-fusion.

The inner carrier pipe and the outer containment pipe may be supported in generally concentric arrangement by a plurality of resilient support clips. Each resilient support clip is of generally unitary construction and comprises a mounting portion defining a generally cylindrical arc of more than 180° but less than 360°. Preferably the mounting portion defines a cylindrical arc of approximately 270°. The mounting portion of each resilient support clip includes first and second axial ends and first and second longitudinally extending edges which are angularly spaced from one another by less than 180° and preferably by approximately 90°.

The resilient support clip further comprises a plurality of support legs which are unitarily molded with the mounting portion of the resilient support clip and which extend generally radially outwardly therefrom. Preferably the resilient support clip includes first and second support legs extending generally radially outwardly from the first and second longitudinally aligned edges of the mounting portion. At least one additional radially aligned support leg extends unitarily from the mounting portion at at least one location thereon spaced angularly from the first and second support legs. The first and second support legs effectively define entrance ramps leading into the generally cylindrical area defined by the inner surface of the mounting portion. In particular, the first and second support legs will be urged into the inner carrier pipe as the resilient support clip is being snapped onto the carrier pipe. Thus, a generally radial force exerted on the resilient support clip and against the carrier pipe will generate a ramping effect between the first and second support legs and the carrier pipe to facilitate the outward deflection of the mounting portion of the support clip.

As noted above, the carrier pipe having the resilient support clips mounted thereto is axially slid into the containment pipe. To facilitate this axial movement of the inner carrier pipe relative to the outer containment pipe, at least the first end of each support leg on the resilient support clip is tapered radially inwardly to define a minor radius. Thus, at least the first end of the resilient support clip defines a smaller external radius than the internal radius of the carrier pipe. Additionally, the radius defined by at least the first end of the resilient support clip is less than the outer radius defined by locations on the support clip intermediate the first and second ends. This tapered configuration greatly facilitates the alignment and axial movement of the inner carrier pipe into the outer containment pipe, yet ensures a secure coaxial support of the carrier pipe relative to the containment pipe.

To prevent permanent deformation of breakage of the mounting portion of the support clip and to enhance the gripping power of the mounting portion, the support clip is provided with a reinforcing flange adjacent the one axial end thereof. In particular, the reinforcing flange extends radially outwardly from the mounting portion and is unitarily formed therewith. Preferably the reinforcing flange extends a distance less than the radial dimension of the support legs. Additionally, it is preferred that the reinforcing flange extend through an arc less than the arc defined by the cylindrical mounting portion. In a preferred embodiment, as explained further below, the reinforcing flange may extend through an arc of approximately 180° on a section of the mounting portion symmetrically opposite the first and second support legs.

The subject double-containment thermoplastic pipe assembly may further or alternatively comprise support discs that may be axially slid over the inner carrier pipe. In particular, each support disc may comprise a central aperture defining an inner circular supporting surface having a diameter substantially equal to the outer diameter of the carrier pipe. The support disc may further define a discontinuous outer supporting surface defining a diameter substantially equal to the inner diameter of the containment pipe. The discontinuous outer support surface of each support disc may define a plurality of support surfaces separated from one another by a plurality of radially inwardly directed through passages for permitting the passage of sensing wires between the inner carrier pipe and the outer containment pipe and/or to permit the flow of any fluid that may leak into the annular space between the inner carrier pipe and the outer containment pipe. The support discs preferably are of unitary molded construction and of generally planar configuration.

The support discs may be axially slid over the inner carrier pipe and fused thereto at selected spaced locations along the inner carrier pipe. Preferably a support disc is disposed in close proximity to each respective opposed end of the carrier pipe. The carrier and containment pipes then are axially moved relative to one another such that the opposed ends of the carrier pipe are generally in line with the opposed ends of the containment pipe. The support discs adjacent the opposed ends of the carrier pipe may then be welded or otherwise fused to the inner circumferential surface of the containment pipe. This assures axial alignment of the respective ends of the carrier and containment pipes and further ensures concentric alignment of the inner carrier pipe relative to the outer containment pipe adjacent the respective axial ends thereof. Two double containment pipe sections may then be simultaneously butt-fused to one another. Accurate simultaneous butt-fusion can readily be achieved in view of the concentric arrangement of the inner and outer pipes adjacent the ends and in view of the axial alignment of those ends. Preferably the assemblies of inner and outer pipes are oriented such that the passages defined by the support discs are generally aligned with one another and are disposed at least at the gravitational bottom portion of the containment pipe. This rotational alignment facilitates the placement of sensor wires in the annular space between the inner and outer pipes, and prevents the build-up of any liquid that may leak from the inner carrier pipe.

DETAILED DESCRIPTION OF THE PREFERRED EMBODIMENTS

Figure 1:
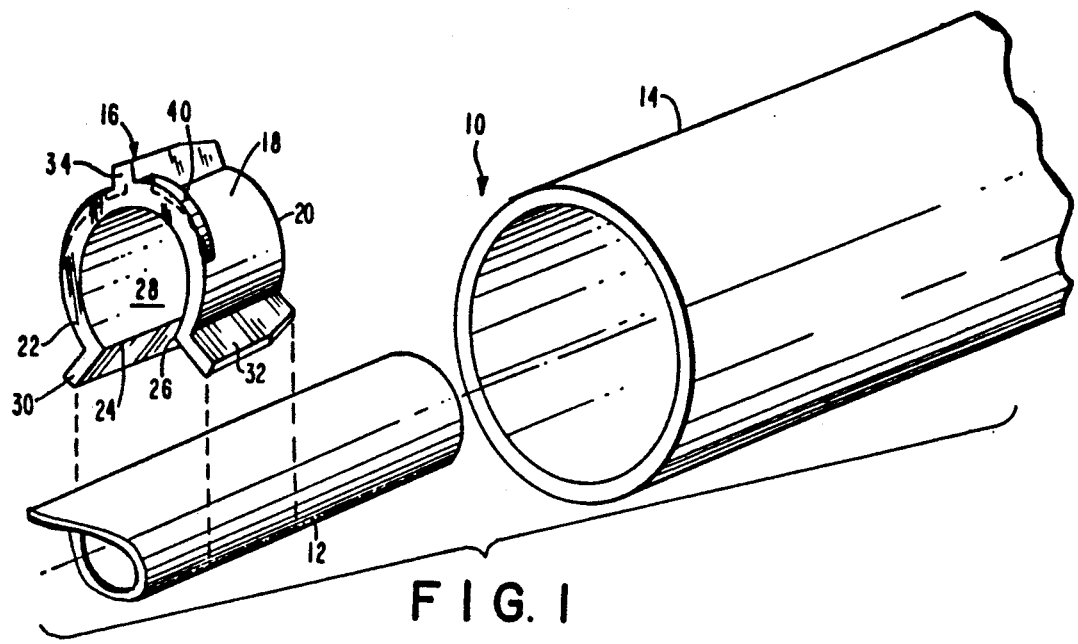
FIG. 1 is an exploded perspective view of a double-containment pipe in accordance with the subject invention.
Figure 2:
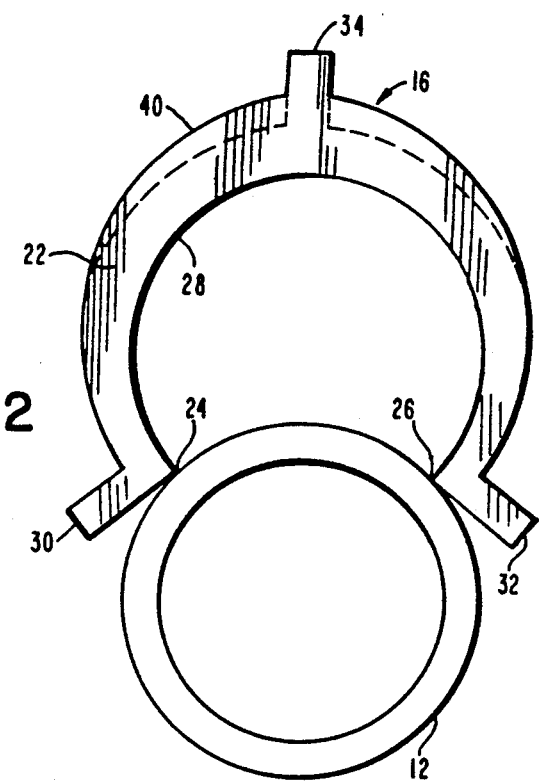
FIG. 2 is an end elevational view of a support clip prior to mounting on a carrier pipe.
Figure 3:
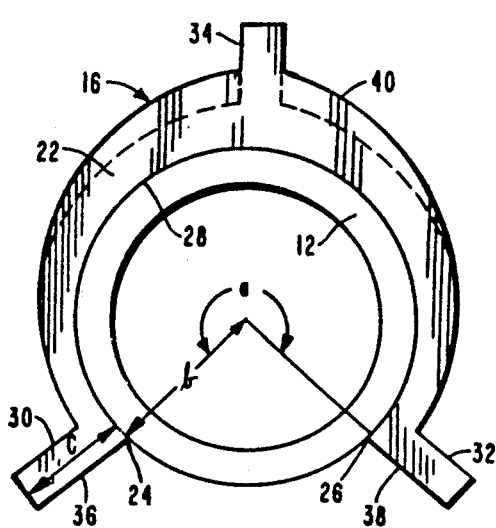
FIG. 3 is an end view of a support clip mounted to a carrier pipe.

The double-containment pipe assembly of the subject invention is identified generally by the numeral 10 in FIG. 1. The assembly 10 comprises an inner carrier pipe 12, an outer containment pipe 14 and at least one resilient support clip 16. The various elements of the double-containment pipe assembly 10 are formed from a thermoplastic material that is suitable for use with the particular chemicals being transported through the inner carrier pipe 12. For example, the inner carrier pipe 12, the outer containment pipe 14 and the resilient support clip 16 all may be formed from a copolymer polypropylene or a polyvinylidene fluoride (PVDF). As explained and illustrated further herein, the inner carrier pipe 12 is supported generally concentrically within the outer carrier pipe 14 by the resilient support clips 16.

The resilient support clips 16 are unitarily molded from a thermoplastic material. In particular, as shown in FIGS. 1-5, each support clip 16 includes a mounting portion 18 having opposed first and second ends 20 and 22 respectively. The mounting portion 18 defines a section of a cylinder extending through approximately 260°-280°, and preferably approximately 270°, as indicated by angle "a" in FIG. 3. Thus, the mounting portion 18 defines first and second longitudinally extending generally parallel edges 24 and 26 which are spaced from one another by an angle of approximately 90°. The mounting portion 18 further includes an inner surface 28 defining a portion of a cylinder having a radius "b" which is substantially equal to or slightly less than the radius defined by the external surface of the inner carrier pipe 12. Thus, as explained in greater detail below, the resilient support clip 16 can be securely and grippingly engaged over the outer cylindrical surface of the inner carrier pipe 12.

The resilient support clip 16 further comprises first, second and third support legs 30, 32 and 34 respectively which extend generally radially outwardly from the mounting portion 18. The first support leg 30 extends unitarily from the mounting portion 18 generally adjacent the first longitudinally extending edge 24, while the second support leg 32 extends unitarily from the mounting portion 18 adjacent the second longitudinally extending edge 26. The third support leg 34 extends radially outwardly and unitarily from the mounting portion 18 at a location thereon generally equidistant from the first and second support legs 30 and 32. The major radial dimension "c" defined by the support legs 30–34 is selected such that the combined distance "b" plus "c" substantially equals or is slightly less than the internal radius of the containment pipe 14. As shown most clearly in FIGS. 2 and 3, it will be noted that the opposed facing surfaces 36 and 38 of the respective first and second support legs 30 and 32 each extend continuously to intersect the inner surface 28 of the mounting portion 18.

Figure 4:
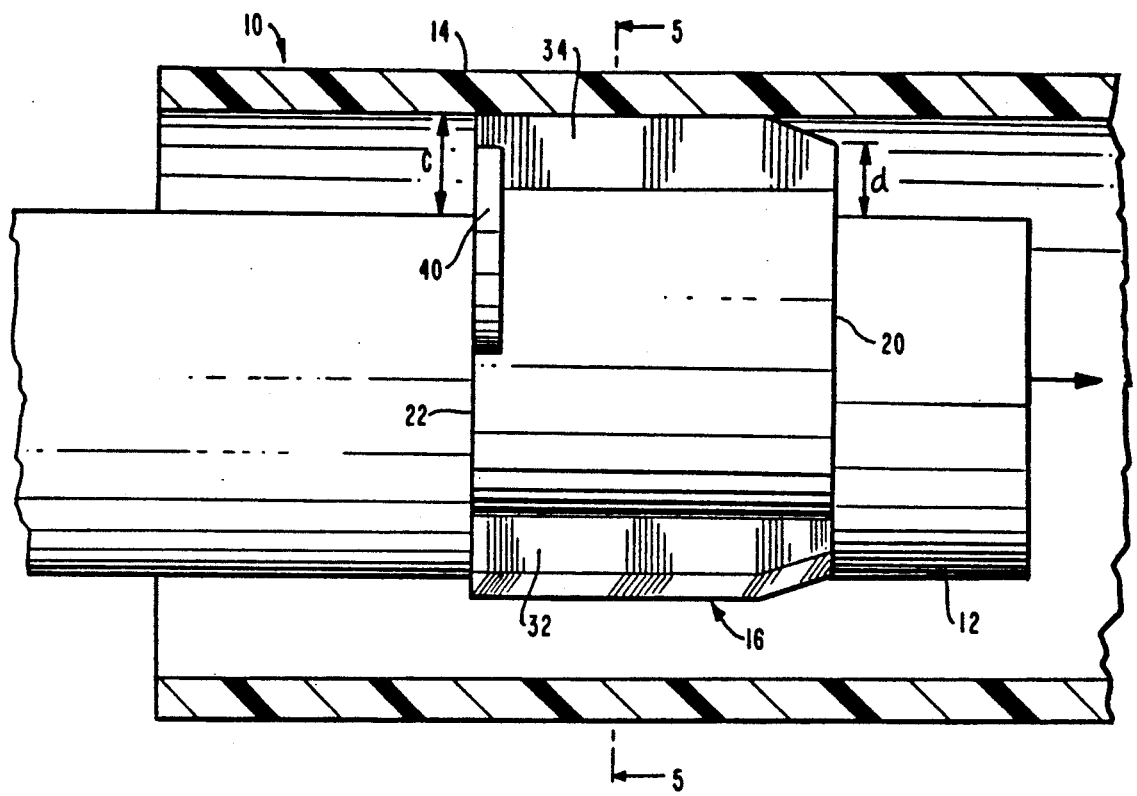
FIG. 4 is a cross-sectional view taken along a plane passing through the longitudinal axis of the double-containment pipe of the subject invention.
Figure 5:
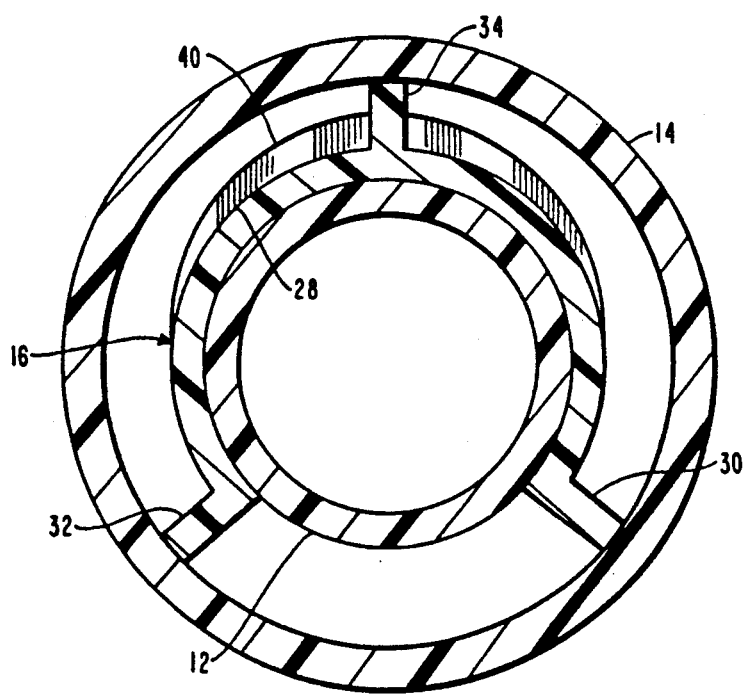
FIG. 5 is a cross-sectional view taken along line 5—5 in FIG. 4.

As shown in FIGS. 1 and 4, portions of the support legs 30–34 adjacent the first end 20 of the resilient support clip 16 are tapered to define a minor radial dimension "d" which is significantly less than the major radial dimension "c" adjacent the second end 22 of the support clip 16. This tapered configuration facilitates the sliding insertion of the inner carrier pipe 12 and the support clip 16 into the outer containment pipe 14. Thus contact between the outer most portions of the support clip 16 and the end of the containment pipe 14 can be avoided minimized.

The second end 22 of the mounting portion 18 is characterized by a flange 40 which extends through an arc of approximately 180° and is symetrically disposed with respect to the third support leg 34 and with respect to the longitudinal edges 24 and 26. The flange 40 reinforces the resilient support clip 16 to prevent overstress during mounting onto the inner carrier pipe 12, and to insure tight gripping of the inner carrier pipe 12 by the mounting portion 18 of the support clip 16. Thus, the support clip 16 is not likely to slide longitudinally along the inner containment pipe 12 in response to frictional forces that may be generated during the insertion of the inner carrier pipe 12 into the outer containment pipe 14. This stronger gripping provided by the flange 40 of the resilient support clip 16 substantially avoids the need to fuse the support clip 16 to the inner carrier pipe 12.

Figure 6:
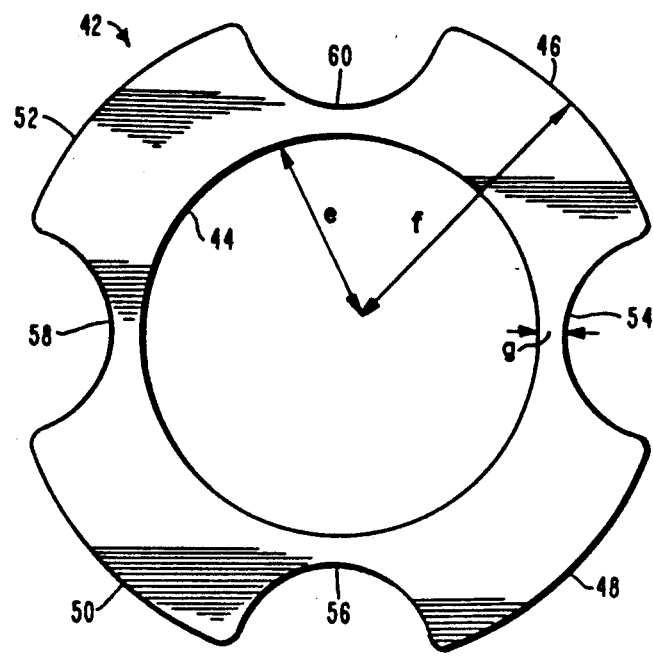
FIG. 6 is a top plan view of a support disc in accordance with the subject invention.
Figure 7:
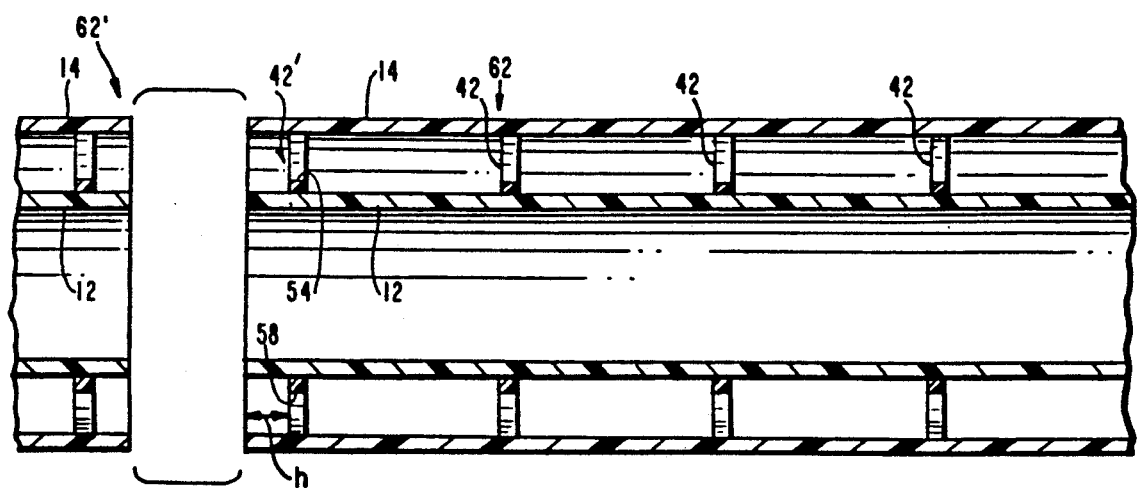
FIG. 7 is a cross-sectional view similar to FIG. 4 but showing a double-containment pipe system incorporating the support discs of FIG. 6.

An alternate support for mounting an inner carrier pipe within an outer containment pipe is identified generally by the numeral 42 in FIGS. 6 and 7. The support 42 is unitarily molded from a thermoplastic material to define a substantially planar support of generally annular configuration. In particular, the unitarily formed support 42 comprises an inner circular support surface 44 defining an opening in the support 42 having a radius "e" substantially equal to or slightly greater than the external radius of the carrier pipe 12 shown in FIG. 7.

The support 42 further defines a plurality of external support surfaces 46, 48, 50 and 52 all of which define arcs of a circle having a radius "f" substantially equal to or slightly less than the internal radius of the outer containment pipe 14 shown in FIG. 7. The circle of the arcuate support surfaces 46–52 is generally concentric with the circular aperture 44 defined in the unitarily formed support 42.

The external periphery of the support 42 is further defined by inwardly directed generally concave passages 54, 56, 58 and 60 which are disposed intermediate adjacent support surfaces 46–52 and define a minimum radial dimension "" which preferably is less than half the radial distance between the inner circular support surface 44 and the external support surfaces 46–52. Preferably the support surfaces 46–52 extend through a combined arc of more than 180° and preferably approximately 240°. This relatively great circumference provided by the support surfaces 46–52 ensures adequate support between the inner carrier pipe 12 and the outer containment pipe 14, and further ensures a significant amount of restraint in areas of adjacent pipe subassemblies to be subject to butt-fusion as explained herein.

The supports 42 can be employed as depicted in FIG. 7. In particular, a plurality of supports 42 are slid over an inner carrier pipe 12 such that the inner circumferential support surface 44 engages the outer surface of the carrier pipe 12. The supports 42 preferably are approximately equally spaced along the length of the carrier pipe 12. Additionally, in the preferred embodiment, the supports 42 are fused to the inner carrier pipe 12. Two of the supports, identified specifically by the numeral 42', are securely fused to the inner carrier pipe 12 at a distance "h" which is less than 3 inches, and preferably about 1 inch, from an end of the inner carrier pipe 12, as shown in FIG. 7.

The inner carrier pipe 12 with the supports 42 securely mounted thereto is then slid axially within the outer containment pipe 14 such that the inner carrier pipe 12 and the outer containment pipe 14 are supported in concentric relationship to one another. In particular, the arcuate support surfaces 46–52 of the support 42 are in supporting contact with the inner circumferential surface of the outer containment pipe 14. The supports 42' adjacent the respective ends of the inner carrier pipe 12 and outer containment pipe 14 then are fused to the inner circumferential surface of the outer containment pipe 14 adjacent the arcuate support surfaces 46–52. This fusing of the arcuate support surfaces 46–52 to the outer containment pipe 14 securely retains the inner carrier pipe 12 and outer containment pipe 14 with the respective ends thereof axially aligned and can replace at least some of the restraint couplings described in U.S. Pat. No. 4,786,088. Additionally, the relatively close spacing "h" of the supports 42 to the respective ends of the inner carrier pipe 12 and the outer containment pipe 14 ensures accurate concentric alignment of the ends of the carrier and containment pipes 12 and 14 respectively.

The inner carriers pipe 12, the outer containment pipe 14 and the supports 42 may be assembled as shown in FIG. 7 either at the installation site or at a place of manufacture. The latter option enables the sale of a completed subassembly comprising an inner carrier pipe 12, an outer containment pipe 14 and a plurality of supports 42 to be sold as a unit.

As shown in FIG. 7, one subassembly 62 comprising an inner carrier pipe 12, an outer containment pipe 14 and a plurality of supports 42 may be butt-fused in end-to-end relationship to a substantially identical structure 62', with the fusion of the respective inner carrier pipes 12 and the respective outer containment pipes 14 being simultaneous. In particular, an appropriate reflective heater can be employed to simultaneously generate the heat required for fusion at the opposed ends of the respective inner carrier pipes 12 and outer containment pipes 14. The proximity of the supports 42 to the respective ends of the inner carrier pipes 12 and outer containment pipes 14 ensures a concentric orientation of the pipes required for the simultaneous fusion.

Preferably, as shown in FIG. 7, the inner carrier pipes 12 and outer containment pipes 14 are rotationally oriented such that a selected one of the inwardly directed peripheral passages 54-60 is generally aligned with the gravitational bottom of the subassembly 62, 62'. This will permit any leakage to flow in the annular space between the carrier pipe 12 and containment pipe 14 to a location where a sensor may be disposed. Alternatively, and preferably, this rotational orientation will permit the passage of a sensor wire 64 through the annular space between the carrier and containment pipes 12 and 14 and at the gravitational bottom of the subassembly 62, 62'. The sensor wire may be operative to sense the presence of a liquid in the annular space between the carrier and containment pipes 12 and 14.

In summary, a double-containment pipe assembly is provided. The assembly includes an inner carrier pipe and an outer containment pipe supported in concentric relationship by unitarily molded supports. The supports may define resilient support clips having a resilient mounting portion defining a section of a cylinder from which a plurality of support legs extend radially outwardly. One end of each support leg may be tapered to facilitate insertion into the outer containment pipe. The resilient support clip preferably comprises a flange at one axial end thereof to provide reinforcement and to prevent over-stress related damage to the support clip. Two of the support legs preferably are disposed to facilitate the outward deflection of the mounting portion during mounting of the support clip onto a carrier pipe. The supports may alteratively define unitarily molded planar structures having an inner annular support surface and a plurality of spaced apart outer support surfaces defining arcs of a circle that is concentric with the inner annular support surface. Passages are defined intermediate adjacent outer support surfaces to enable the passage of sensor wires through the annular space between the carrier and containment pipes or to permit flow of any leaked fluid to a sensor location. The supports preferably are securely attached to the carrier pipe at spaced apart locations therealong. Additionally, the supports preferably are securely connected to both the carrier and containment pipes at locations spaced inwardly approximately 1 inch from the respective aligned ends of the carrier and containment pipes to permit simultaneous butt-fusion of pairs of inner and outer pipes in end to end relationship.

While the invention has been described with respect to certain preferred embodiments, it is apparent that various changes can be made without departing from the scope of the invention as defined by the appended claims.

I claim:

1. A unitarily molded resilient thermoplastic support clip for maintaining an inner carrier pipe in concentric relationship to an outer containment pipe, said support clip comprising a resilient mounting portion defining a section of a cylinder with an inner surface dimensioned for mounting on the carrier pipe, said mounting portion having opposed first and second axial ends and opposed first and second spaced apart longitudinally extending edges, said mounting portion having a reinforcing flange extending outwardly from said second axial end thereof and through an arc of approximately 180° around said mounting portion for preventing overstress of said mounting portion, said reinforcing flange being generally symmetrically disposed on areas of said mounting portion equally spaced from the first and second edges thereof, and a plurality of radially aligned support legs extending unitarily outwardly from the mounting portion to define a major radius for said support clip substantially equal to an inner radius for the outer containment pipe, said plurality of support legs defining at least a first, second and third support legs, said first and second support legs being respectively aligned with the first and second edges of said mounting portion, said resilient mounting portion extending through an arc of approximately 270° such that movement of the first and second support legs against the inner carrier pipe in a direction orthogonal to the longitudinal axis of the inner carrier pipe generates outward deflection of the mounting portion for mounting the support clip to the inner carrier pipe, portions of said support legs in proximity to the first axial end of said mounting portion being tapered to define a minor radius less than the inner radius of the outer containment pipe.

* * * * *